June 10, 1924.

C. M. NEVIUS

COFFEE MILL

Filed Oct. 8, 1923

1,496,823

Inventor:
Condict M. Nevius
by his attorney
Farnum F. Dorsey

Patented June 10, 1924.

1,496,823

UNITED STATES PATENT OFFICE.

CONDICT M. NEVIUS, OF HORNELL, NEW YORK.

COFFEE MILL.

Application filed October 8, 1923. Serial No. 667,213.

*To all whom it may concern:*

Be it known that I, CONDICT M. NEVIUS, a citizen of the United States, residing at Hornell, in the county of Steuben and State of New York, have invented certain new and useful Improvements in Coffee Mills; and I do hereby declare the following to be a full, clear, and exact description of the invention, such as will enable others skilled in the art to which it appertains to make and use the same.

This invention relates to coffee-mills of the type in which a mass of coffee is given a whirling motion within a cylinder, provided with a series of cutting blades adjacent to slots through which the ground coffee escapes. In such machines it has been proposed to regulate the fineness, to which the coffee is ground, by adjusting the effective width of the slots through which it escapes.

In Letters Patent of the United States No. 1,459,790, dated June 26, 1923, I have disclosed a machine of the type in question, in which two concentric slotted cylinders are used, the outer cylinder being provided with integrally-formed cutting-blades, and the inner cylinder constituting a guard-cylinder to control the effective width of the slots. The object of the present invention is to simplify and improve the construction in question, while also increasing the efficiency of the machine. I have found that this may be accomplished by reversing the relative position of the two cylinders and by changing the shape of the slots in the cutter-cylinder in such a way as to facilitate the access of the coffee-grains to the cutting-edges.

Another feature of the invention resides in simple and effective means for producing and controlling the relative rotation of the cylinders, through which the effective width of the slots is adjusted.

Figure 1:
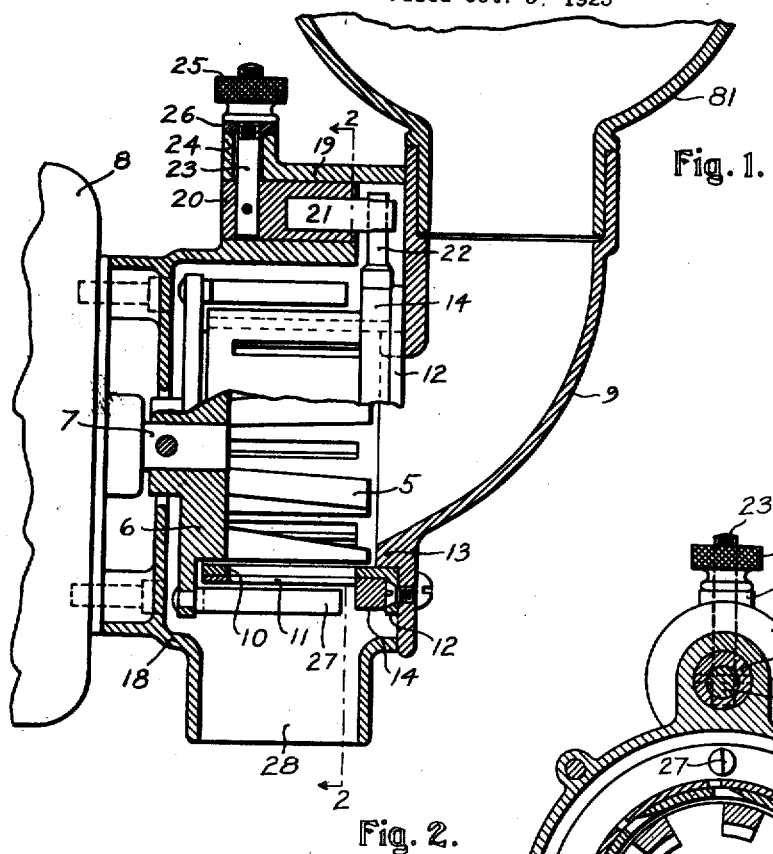
Figure 2:
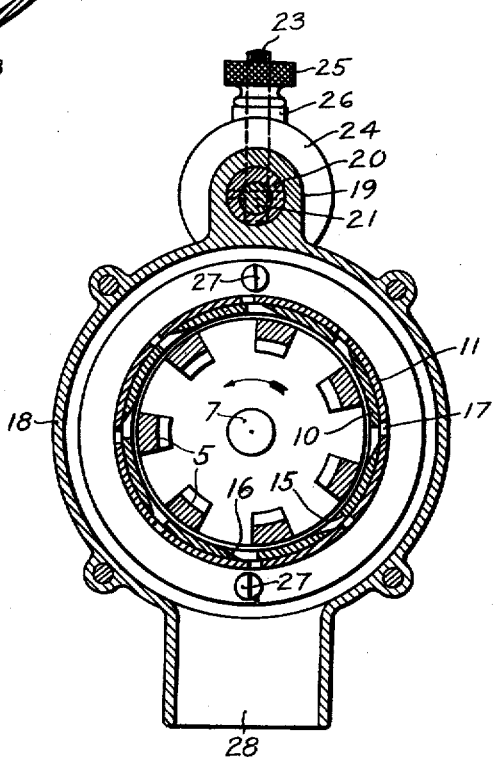

In the accompanying drawings Fig. 1 is a side-elevation, partly in section, of a coffee-mill embodying the present invention; and Fig. 2 is a section on the line 2—2 in Fig. 1.

The invention is illustrated as embodied in a mill in which the whirling motion is imparted to the coffee by a rotary impeller comprising a series of arms 5 projecting, in cylindrical relation, from a disc 6. This disc is fixed on a power shaft 7, which may conveniently be the armature shaft of an electric motor, one end of the casing 8 of such motor being shown in Fig. 1.

The coffee is introduced into the space within the arms 5 through a curved passage 9, which is fed in the usual manner by a hopper 81.

The cutter-cylinder 10 is closely embraced by the guard-cylinder 11. The cutter-cylinder is stationary, being fixed by an end-flange 12 which is screwed to the housing of the mill. It is centered by a flange 13 projecting inwardly on the housing. The guard-cylinder is rotatable upon the cutter-cylinder, for the purpose of adjustment, and is provided at one end with a ring 14 to which the adjusting-means are attached.

As shown in Fig. 2, both cylinders are provided with cooperating slots, and a feature of the invention resides in the form of the slots in the cutter-cylinder. Each of these slots has, at one side, an edge forming substantially a right-angle with the inner surface of the cylinder, while the opposite edge is beveled at a very obtuse angle. The square edge, 15, constitutes the cutting-edge, since the impeller is rotated in the direction, as indicated by the arrow in Fig. 2, to throw the coffee against this edge. The beveled edge has the function of permitting the coffee both to enter and to leave freely the space adjacent the cutting-edge.

In the fine grinding or pulverizing of coffee in a mill of the type in question, it has been found that the best results are secured by using a cutter having a relatively obtuse or blunt edge such as the square edge 15 herein illustrated. Where the operation of the mill is regulated by a simple guard-cylinder as herein shown, this cylinder does not cooperate with the cutter-cylinder to control directly the size of the particles cut from the coffee-beans, but it acts merely to control the escape of cut particles from the zone of action. When a coffee-bean is thrown forcibly against the cutter-blade it is more or less crushed, with the formation of particles of various sizes. Such of these particles as are of the desired degree of fineness may escape at once through the slot adjacent the blade, but the coarser particles must be returned to the space within the cutter-cylinder, so as to continue their whirling motion and be brought again into engagement with a cutter-blade. I have found that this action results most effectively where the slots in the cutter-cylinder are of the form described, for in this case each such slot constitutes, in effect, a shallow widely-open pocket into which the particles are thrown by centrifugal force, and out of which the coarser particles may be again impelled by impingement of the stream of following particles.

The slots 17 in the guard-cylinder may be of any form which will not tend to cause jamming of the ground material.

For the purpose of adjusting the guard-cylinder, the housing 18 of the mill is provided with an upper extension 19 which is bored to receive a short rock-shaft 20. This rock-shaft is bored eccentrically to receive a loose pivot-pin 21, and the end of the pin is forked to engage the end of an arm 22. This arm is fixed radially in the ring 14 on the end of the guard-cylinder. An arm 23, fixed in the rear end of the rock-shaft, extends through an arcuate slot in a flange 24 on the housing, and a nut 25, threaded on the outer end of the arm 23, engages a washer 26 which seats upon the periphery of the flange. By swinging the arm 23 the rock-shaft may be turned, which results, in an obvious manner, in a slight partial rotation of the guard-cylinder upon the cutter-cylinder, and the parts may then be frictionally secured in adjusted position by tightening the nut 25 against the washer 26.

The disc 6 carries two fan-blades 27 which create a current of air within the housing by which the ground material is entrained and is carried to the discharge-spout 28.

The invention is not limited to the embodiment herein described and illustrated, but it may be embodied in various other forms within the scope of the following claims.

The invention claimed is:

1. In a coffee-mill, in combination with a rotary impeller, two concentric slotted cylinders, each slot in the inner or cutter-cylinder being substantially square at one side, to form a cutting-edge, and inwardly bevelled at the opposite side to promote access of the coffee to the cutting-edge.

2. A coffee-mill, as defined in claim 1, provided further with means for producing a partial relative rotation of the two cylinders to adjust the extent of overlap of their slots.

3. In a coffee-mill, in combination with a rotary impeller, a stationary cutter-cylinder provided with pockets, in its inner surface, each having two inwardly-divergent walls, one of said walls forming an obtuse angle with the inner surface of the cylinder and the other forming substantially a right-angle therewith; said pockets being of greater width than depth, and the cutter-cylinder being provided, at the bottom of each pocket, with a relatively narrow slot for the escape of the ground material.

4. A coffee-mill, as defined in claim 3, provided further with means for adjusting the effective width of said slots.

5. In a coffee-mill comprising a cutter-cylinder and a concentric guard-cylinder, means for relatively adjusting the cylinders by partial rotation, comprising an arm projecting radially from one cylinder; a rock-shaft; a pin eccentrically mounted in the rock-shaft and connected to said arm; and means for rocking the rock-shaft and for securing it in adjusted position comprising a second arm projecting from the rock-shaft and screw-threaded, an arcuate stationary member with a slot in which said second arm may swing, and a nut threaded on said arm and adapted to apply frictional pressure against the periphery of the stationary member to secure the parts in adjusted position.

CONDICT M. NEVIUS.